July 4, 1944.  H. C. HILL  2,352,898

ENGINE BREATHER VALVE

Filed March 7, 1941

INVENTOR
Henry C. Hill.
BY
ATTORNEY

Patented July 4, 1944

2,352,898

UNITED STATES PATENT OFFICE 2,352,898

ENGINE BREATHER VALVE

Henry C. Hill, Montclair, N. J., assignor to Wright Aeronautical Corporation, a corporation of New York Application March 7, 1941, Serial No. 382,145

10 Claims. (Cl. 121—194)

This invention relates to internal combustion engines and is concerned particularly with improvements in the crankcase breathing system of aircraft engines.

An object of the invention is to provide a breathing arrangement which will prevent the outflow of lubricating oil which may have accumulated in the crankcase, upon engine starting. A further object is to provide a breather system having a gravity controlled valve whereby the breather opening may be closed during inverted flight to prevent loss of lubricating oil. A further object of the invention is to provide an oil pressure operated breather valve so that opening of the breather valve is accomplished by operation of the engine. In this connection, the breather is closed when the engine is not running, preventing the entrance of foreign matter. Further objects of the invention will become apparent in reading the annexed detailed description in connection with the drawing, in which:

Figure 1:
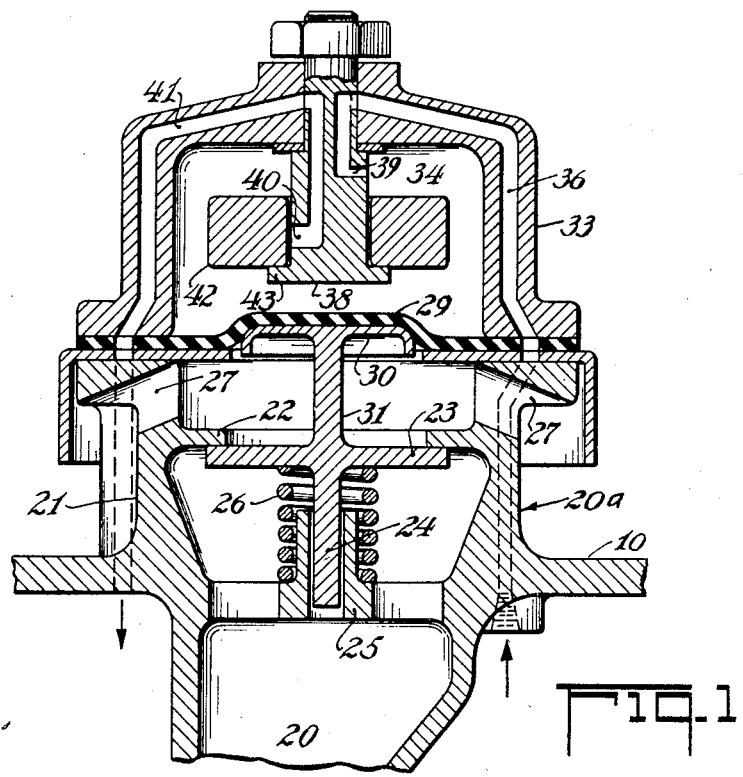
Fig. 1 is a section through the valve system of this invention.
Figure 2:
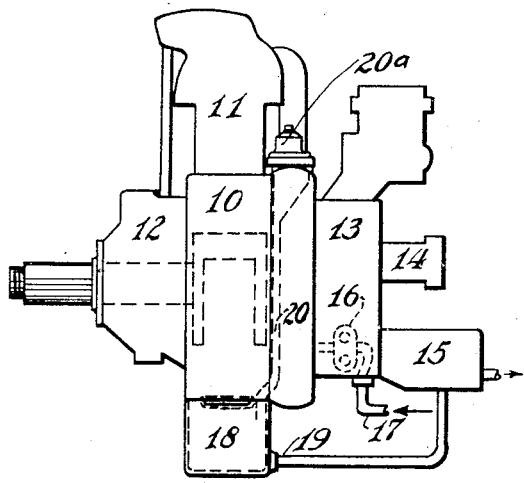
Fig. 2 is a side elevation of an aircraft engine upon which the breather system is installed.

Referring first to Fig. 2, an engine cranckcase 10 is provided with the usual cylinders one of which is shown at 11, a front section 12 and a rear section 13. The front and rear sections respectively house the reduction and valve gear, and the accessory drive system for accessories such as the starter 14 and auxiliary apparatus 15. An engine driven oil pump is indicated at 16 which receives oil from an external tank, not shown, through a conduit 17. Lubricating oil is delivered by the pump 16 to the various engine parts requiring lubrication, and surplus oil bleeding from these parts passes into an oil sump 18 whence it is withdrawn through a conduit 19 and delivered to the oil tank by a scavenging pump in the apparatus 15. Breathing of the crankcase is accomplished through a cored passage 20 within the engine which opens at its lower end to the sump 18 and at its upper end to the atmosphere through the breather valve assembly 20a. Since the breathing is done through the oil sump, inversion of the engine in flight will tend to cause dumping of the sump oil through the breather passage 20 and to the atmosphere. Also, should the engine have been idle for a substantial period, the sump will become substantially filled with lubricating oil, and when the engine is started crankcase compression impulses may build up to a sufficient degree to discharge sump oil out through the breather before the scavenging oil pump has an opportunity to remove the surplus oil from the sump. It is primarily to overcome the above difficulties that the subject invention has been developed.

In detail, the valve assembly 20a comprises a housing 21 on the top of the crankcase in which a valve seat 22 is formed. A poppet valve 23 engages the seat 22, and carries a stem 24 engaging a guide 25 rigid with the housing 21. The valve 23 is normally urged to a closed position by a spring 26 embracing portions of the guide 25 and the stem 24.

Above the seat 22, substantially radial breather ports 27 are provided. Over the top face of the housing 21 a yielding diaphragm 29 is disposed, the center portion thereof resting upon a platform 30 integral with the valve 23 through a stem 31. Above the diaphragm 29 is disposed a container 33 which defines, with the diaphragm, a closed chamber 34 to which pressure oil or other fluid may be admitted for the purpose of pressing downwardly upon the platform 30 and opening the breather valve 23. Pressure oil is led from the engine oil pump 16 through a passage 36 to the top of the container 33, where it communicates with a valve stem 38 entering the chamber 34. This valve stem has a restricted port 39 toward its upper end communicating with the passage 36 and has a port 40 toward its lower end communicating, through a passage 41, with the crankcase interior. Over the stem 38 is disposed a freely slidable ring 42 which, when the engine is in an upright attitude, will drop to rest upon a flange 43 at the bottom end of the stem 38, covering the port 40 and preventing any substantial escape of pressure fluid from the chamber 34. If, however, the engine is inverted, as may obtain during inverted flight, the ring 42 slides along the stem 38 to cover the port 39 and to open the port 40, thus cutting off the feed of pressure oil to the chamber 34 and relieving oil pressure in the chamber through the port 40. With relief of chamber pressure, the spring 26 closes the valve 23 against its seat 22 to prevent spillage of lubricant, also preventing breathing of the crankcase. Preferably the spring is fairly stiff, requiring about 20 pounds per square inch pressure to open the valve.

During normal operation of the engine both on the ground and in upright or normal flight, the breather valve is held open to perform its usual function. Upon regaining a normal flight attitude, the breather valve is opened.

Under normal conditions, the amount of time during which an aircraft may be inverted is brief so that excessive crankcase compression is not likely to build up at such times as the breather valve is closed. Even protracted closure of the breather will cause no damage prior to that time when scavenging trouble may begin to assert itself.

When the engine is not operating, there will of course be no oil pressure in the chamber 34 and the breather valve 23 will be closed. Upon first starting the engine, there will be a short interval of time before oil under pressure reaches the chamber 34 due to the restricted port 39, and during this interval the breather valve will of course be closed. This interval will give the engine scavenging oil pump an opportunity to clear excess accumulations of oil from the sump 19. Normal breathing for the engine is established just as soon as pressure oil reaches the chamber 34.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an invertible engine having positive crankcase pressure during operation and a breathing opening at a normally high level thereon, a valve normally closing said breathing opening, mechanism responsive to engine running to open said valve to permit issue of crankcase vapors therefrom, and means responsive to engine inversion to negative the effect of said mechanism and to close the valve.

2. In an invertible engine having positive crankcase pressure during operation and a breathing opening, a valve normally adapted to close said opening, means responsive to engine operation in an upright attitude to hold said valve open to permit issue of crankcase vapors therefrom, and means operable upon engine inversion to close said valve.

3. In an engine having a breather opening and having fluid pressure producing means responsive to engine operation, a breather closing valve, resilient means urging said valve closed, a fluid pressure operated motor for opening said valve against the resilient means, and a fluid valve operable in response to engine inversion to cut off fluid pressure from said motor to allow of breather valve closure.

4. In a breather opening control valve assembly for an invertible engine, a valve seat, an air valve closable thereon and having a piston associated therewith, a pressure fluid chamber with which said piston is operably associated, a fluid pressure connection to said chamber, a bleed connection to said chamber, and a fluid valve operable under the influence of gravity, to close one or the other of said connections from said chamber.

5. In a breather opening control valve assembly for an invertible engine, a valve seat, an air valve closable thereon and having a piston associated therewith, a pressure fluid chamber with which said piston is operably associated, a fluid pressure connection to said chamber, a bleed connection to said chamber, and a gravity responsive fluid valve to connect said fluid pressure connection to the chamber when the engine is upright while closing off the bleed connection, and to connect said bleed connection to the chamber when the engine is inverted while closing off said fluid pressure connection.

6. In a breather opening control valve assembly for an invertible engine, a valve seat, an air valve closable thereon and having a piston associated therewith, a pressure fluid chamber with which said piston is operably associated, a fluid pressure connection to said chamber, a bleed connection to said chamber, a gravity responsive fluid valve to connect said fluid pressure connection to the chamber when the engine is upright while closing off the bleed connection, and to connect said bleed connection to the chamber when the engine is inverted while closing off said fluid pressure connection, and resilient means urging the air valve closed.

7. In an engine breather valve assembly, a fluid chamber having an elastic diaphragm, an air valve operated by diaphragm movements, a substantially vertical fluid valve stem in said chamber having axially spaced openings one of which is connected to a fluid pressure source and the other of which is connected to discharge within the engine, and a freely slidable gravity actuated sleeve movable over said stem to cover one or the other of said stem openings while leaving the other and the one, respectively, uncovered.

8. In a breather system for an engine crankcase, a breather passage including a seat, a valve movable into engagement with the seat to close said passage and movable away from the seat to open said passage, power means for moving said valve, and means responsive to engine position to control said power means to open the valve when the engine is upright and to close the valve when the engine is inverted.

9. In a breather system for an engine crankcase, a breather passage for said crankcase, a valve in said passage, means operative when the engine is running and in its normal position to effect movement of said valve to its open position, and means operative when the engine is inverted from its normal position to effect movement of said valve to its closed position and also operative when the engine is not running to effect movement of said valve toward said closed position.

10. In a breather system for an engine crankcase, a breather passage for said crankcase, a normally closed valve in said passage, means to open said valve in response to engine operation, and means responsive to inversion of said engine from its normal position to render said valve opening means ineffective.

HENRY C. HILL.